United States Patent
Krumkalns et al.

[15] 3,655,359
[45] Apr. 11, 1972

[54] PLANT GROWTH CONTROL

[72] Inventors: Eriks V. Krumkalns; Harold M. Taylor, both of Indianapolis, Ind.

[73] Assignee: Eli Lilly and Company, Indianapolis, Ind.

[22] Filed: Oct. 16, 1969

[21] Appl. No.: 867,058

Related U.S. Application Data

[63] Continuation-in-part of Ser. No. 785,737, Dec. 20, 1968, abandoned.

[52] U.S. Cl. ................................... 71/94, 71/78, 71/90
[51] Int. Cl. .................................................. A01n 9/22
[58] Field of Search ............................................ 71/78, 94

[56] References Cited

UNITED STATES PATENTS 3,396,224  8/1968  Van Heyningen ................... 424/275

OTHER PUBLICATIONS

Novikov et al. " Stimulators of Plant Growth" Chem. Abst. Vol. 61 (1964) 8829d

Saur Milch " Comparative Wheat Germination Tests with Compounds of the Pyridine Series" Chem. Abst. Vol. 57 (1962) 1316F

*Primary Examiner*—Lewis Gotts
*Assistant Examiner*—Catherine L. Mills
*Attorney*—Everet F. Smith and Leroy Whitaker

[57] ABSTRACT

The growth of unwanted weed seeds and seedling weeds is inhibited by applying to the locus thereof a herbicidal composition containing one or more substituted 3-pyridylmethanes as the herbicidally active ingredient. The growth of suckers on tobacco plants is controlled by applying these compositions to the growing plants.

9 Claims, No Drawings

PLANT GROWTH CONTROL

CROSS-REFERENCE

This application is a continuation-in-part of our co-pending application, Ser. No. 785,737 filed Dec. 20, 1968, now abandoned.

BACKGROUND OF THE INVENTION

In the prior art, D'Amico, U.S. Pat. No. 3,155,671 Nov. 3, 1964) teaches the preparation of derivatives of 2-thiopyridine-1-oxide, which destroy or control undesired vegetation.

Johnson et al., Belgian Pat. No. 645,271 Sept. 16, 1964), teach the use of 4-hydroxytrihalo (or tetrahalo) pyridines as herbicides. These pyridine compounds were applied to the foliage of cucumber plants and wild grass to kill the wild grass.

In addition, Kovikov et al., Khim v. Sel'sk. Khoz. 4(6), 435–7(1966), tested semi- and thiosemicarbazones of 2-, 3-, and 4-pyridinecarboxaldehyde and teach the thiosemicarbazone of 2-pyridinecarboxaldehyde as having the highest herbicidal activity.

SUMMARY

This invention relates to novel processes for eliminating germinating weed grasses and broadleaf weeds and to compositions useful in these novel processes. More particularly, this invention concerns novel herbicidal processes employing compositions in which a substituted 3-pyridylmethane is the herbicidally active ingredient.

It is an object of this invention to provide compositions which are toxic to both grasses and broadleaf weeds in both their germinating and seedling stages, but which compositions are relatively nontoxic to crop plants. It is a further object of this invention to provide novel compositions and processes which can eliminate weed grasses and certain broadleaf weeds selectively from crop plants such as corn, cotton, and soybeans, and their close relatives in the plant kingdom. It is still another object of this invention to provide novel compositions and processes which inhibit the growth of suckers on tobacco plants.

DESCRIPTION OF THE PREFERRED EMBODIMENT

One embodiment of the novel process of this invention comprises applying to an area infested with weed seeds and seedling weeds a herbicidal amount of one or more substituted 3-pyridylmethanes having the following formula:

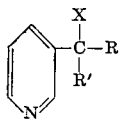

wherein X is hydrogen, hydroxyl, $C_1$–$C_3$ alkoxy, amino, or cyano;

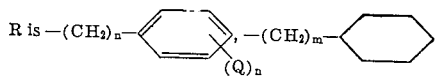

$C_1$–$C_6$ alkoxy, $C_1$–$C_{12}$ alkyl, $C_2$–$C_8$ alkenyl, $C_2$–$C_8$ alkynyl, $C_3$–$C_8$ cycloalkyl, or $C_4$–$C_8$ cycloalkenyl; R' is R, pyridyl, or thienyl;

each Q independently is halo, nitro, $C_1$–$C_3$ alkyl, $C_1$–$C_3$ alkoxy, trifluoromethyl, $C_1$–$C_3$ alkylthio, $C_1$–$C_3$ alkyl—SO—, or $C_1$–$C_3$ alkyl—SO$_2$—, or two Qs taken together are methylenedioxy;
each n independently is an integer of 0 to 3; and m is an integer of 1 to 3;
and the acid addition salts thereof.

In another embodiment of the process of this invention a composition containing one or more of the above-described pyridylmethanes is applied to growing tobacco plants to inhibit the growth of laterals, or suckers, on such plants.

While a number of substituents have been indicated for the phenyl groups in the above formula, it will be apparent to those skilled in the art that other substituents may also be used, and that substitution may occur on other than the phenyl groups. When there is more than one substituent present they may be the same or different. Compounds bearing such substituents are thus to be considered to be within the scope of this invention.

In the above formula, $C_1$–$C_6$ alkoxy can be, for example, methoxy, ethoxy, isopropoxy, butoxy, pentoxy, and hexoxy.

The $C_1$–$C_{12}$ alkyl groups can be, illustratively, methyl, ethyl, propyl, isopropyl, n-butyl, sec.-butyl, tert.-butyl, n-amyl, isoamyl, sec.-amyl, n-hexyl, isohexyl, sec.-hexyl, n-heptyl, isoheptyl, sec.-heptyl, n-octyl, sec.-octyl, isooctyl, nonyl, decyl, undecyl, dodecyl, and the like.

$C_3$–$C_8$ cycloalkyl can be, illustratively, cyclopropyl, cyclobutyl, cyclopentyl, cyclohexyl, cycloheptyl, and cyclooctyl.

The alkenyl and alkynyl groups can be such as vinyl, allyl, 1-butenyl, 2-pentenyl, 2-octenyl, 1-butynyl, 2-propynyl, 2-hexynyl, and 1-octynyl.

Suitable cycloalkenyl groups include cyclohexenyl, cyclopentenyl, cyclobutenyl, cyclooctenyl, and norbornenyl.

Halo includes chlorine, bromine, iodine, and fluorine.

The acid addition salts of the compounds represented by the general formula supra are represented by those formed with hydrochloric, hydrobromic, hydriodic, sulfuric, nitric, p-toluenesulfonic, maleic, acetic, and malonic acids and the like.

Examples of compounds which have the desired activity and which can be successfully employed as weed-killing agents and tobacco desuckering agents in accord with the novel processes of this invention include, but are not limited to, the following:

3-[Bis-(4-fluorophenyl)methyl]pyridine
α-(4-chlorophenyl)-α-cyclopropyl-3-pyridinemethanol
α,α-Bis(2-chlorophenyl)-3-pyridinemethanol hydrochloride
α-(2,4-Dichlorophenyl)-α-(4-fluorophenyl)-3-pyridinemethanol hydrochloride
α-(4-Fluorophenyl)-α-phenyl-3-pyridinemethanol hydrochloride
α,α-Bis(n-pentyl)-3-pyridinemethanol hydrochloride
α-(2-Chlorophenyl)-α-(4-fluorophenyl)-3-pyridinemethanol hydrochloride
α-(n-Hexyl)-α-methyl-3-pyridinemethanol
3-(1-Isobutyl-3-methylbutyl)pyridine
α,α-Bis(isobutyl)-3-pyridinemethanol
α-(2,5-Dimethylphenyl)-α-phenyl-3-pyridinemethanol hydrochloride
α-Chloro-α,α-bis-(4-chlorophenyl)-3-pyridylmethane hydrochloride
α,α-Bis-(4-chlorophenyl)-3-pyridylmethylamine hydrochloride
α,α-Bis-(4-chlorophenyl)-3-pyridylmethyl methyl ether
α-Cyclobutyl-α-(4-fluorophenyl)-3-pyridinemethanol
α-Pentafluorophenyl-α-phenyl-3-pyridinemethanol
3-(α-Methyl-4-chlorobenzyl)pyridine hydrochloride
3-(Dicyclohexylmethyl)pyridine
α,α-Bis(cyclohexyl)-3-pyridinemethanol
α,α-Bis(isopropyl)-3-pyridinemethanol
3[1-(n-heptyl)-n-octyl]pyridine
α,α-Bis(isopentyl)-3-pyridinemethanol hydrochloride
3-[α-Cyclohexyl-α-(1-cyclohexenyl)methyl]pyridine
α,α-Bis(n-hexyl)-3-pyridinemethanol hydrochloride
α,α-Diphenyl-3-pyridineacetonitrile
α-(3-Ethyl-n-pentyl)-α-isobutyl-3-pyridinemethanol hydrochloride
α,α-Bis(cyclopropyl)-3-pyridinemethanol hydrochloride
α,α-Bis(n-propyl)-3-pyridinemethanol hydrochloride α,α-Bis(4-iodophenyl)-3-pyridylmethane p-toluenesulfonate
α-Phenyl-α-(4-chlorobenzyl)-3-pyridylmethane
α-Phenyl-α-(2-thienyl)-3-pyridylmethane
α-(4-chlorophenyl)-α-(2-thienyl)-3-pyridylmethane maleate
α-(3,4-dichlorobenzyl)-α-(3-chlorophenyl)-3-pyridylmethane
α-(4-methylthiophenyl)-α-phenyl-3-pyridylmethane
3-(α-n-Butylbenzyl)pyridine
α-(4-Ethoxyphenyl)-α-phenyl-3-pyridylmethane hydrobromide
α,α-Bis(4-ethylphenyl)-3-pyridylmethane oxalate
α,α-Bis(4-nitrophenyl)-3-pyridylmethane
α-(3-Bromophenyl)-α-phenyl-3-pyridylmethane sulfate
α,α-Bis(3-bromophenyl)-3-pyridylmethane nitrate
α-Cyclopentyl-α-(4-chlorophenyl)-3-pyridylmethane
α-Cyclohexyl-α-(3-bromophenyl)-3-pyridylmethane
α-(2-Chlorobenzyl)-α-cyclooctyl-3-pyridylmethane
α-Phenyl-α-(3-thienyl)-3-pyridylmethane
α-(4-Chlorophenyl)-α-(2-pyridyl)-3-pyridylmethane
α-Cyano-α-phenyl-α-(3-thienyl)-3-pyridylmethane
Tri-(3-pyridyl)methane
α,α-Bis-(4-iodophenyl)-3-pyridinemethanol
α-(2-Fluorophenyl)-α-phenyl-3-pyridinemethanol
α-Vinyl-α-phenyl-3-pyridinemethanol
α,α-Bis-(4-chlorophenyl)-3-pyridylmethyl acetate
α-Phenyl-β-(2-pyridyl)-α-(3-pyridyl)ethyl acetate
α-(4-Bromophenyl)-α-phenyl-3-pyridinemethanol
α-(4-Chlorobenzyl)-α-allyl-3-pyridinemethanol
α-(4-Methyl-3-chlorophenyl)-α-(2-thienyl)-3-pyridinemethanol
α-(2-Butenyl)-α-(4-methoxybenzyl)-3-pyridinemethanol
α-(4-Iodobenzyl)-α-(4-pyridyl)-3-pyridinemethanol
α,α-Bis-(2-phenylethyl)-3-pyridinemethanol
α-n-Amyl-α-n-hexyl-3-pyridinemethanol
α,α-Bis(n-undecyl)-3-pyridinemethanol
α-n-Hexyl-α-n-heptyl-3-pyridinemethanol
α,α-Bis(cyclohexylmethyl)-3-pyridinemethanol hydrochloride
α-Isopentyl-α-isohexyl-3-pyridinemethanol hydrochloride
α-n-Undecyl-α-n-nonyl-3-pyridinemethanol sulfate
α,α-Bis(isopentyl)-3-pyridinemethanol hydrobromide
α-n-Dodecyl-α-n-octyl-3-pyridinemethanol phosphate
α,α-Bis(n-hexyl)-3-pyridinemethanol sulfate
α,α-Bis(n-undecyl)-3-pyridinemethanol phosphate
α,α-Bis(sec.-nonyl)-3-pyridinemethanol oxalate
α,α-Bis(n-dodecyl)-3-pyridinemethanol hydrochloride
α,α-Bis(undecyl)-3-pyridinemethanol hydrochloride
α,α-Bis(n-octyl)-3-pyridinemethanol hydrobromide, and the like.

The preferred compounds, both for herbicidal use and to inhibit tobacco sucker growth, are those in which X in the above formula is hydrogen or hydroxyl.

The compounds are formulated for use either as dusts, spray concentrates, spreadable granules, or wettable powders. Those compounds which are soluble in water are readily formulated as emulsion-type sprays or wettable powders. Compounds which are less soluble in water are desirably formulated with a wetting agent or surfactant for the preparation of emulsion-type sprays or wettable powders. The wetting agent or surfactant used in formulating the emulsion-type sprays or wettable powders can be, illustratively, polyoxyethylene sorbitan monooleate, polyoxyethylene sorbitan monolaurate, polyglycol ether sulfonate, alkylamine dodecylbenzenesulfonate, and the like. In the preparation of spreadable granules, the solid diluent used can be calcined attapulgite clay. Dry dispersions can be prepared on herbicidally inert carriers such as vermiculite, peat moss and the like.

The novel herbicidal processes of this invention comprise the treatment of a soil area or locus infested with weed grass seeds, broadleaf weed seeds and seedling weeds with a spray, a dust, or a granular formulation containing, as the herbicidally active ingredient, a compound coming within the scope of the above generic formula. Typical of soil areas upon which the instant formulations can be used as preemergent herbicides are crop-growing areas wherein corn, cotton, or soybeans are being grown. Other miscellaneous places which can be treated include gravel driveways, clay tennis courts, walks, road shoulders, and the like, where the elimination of weeds and grasses is desired. When used as complete herbicides in these latter locations, the compositions of this invention are preferred over the older forms of complete herbicides such as sodium arsenite or aminotriazole because of the lower mammalian toxicity exhibited by the instant pyridine compounds. Compositions containing the herbicidally active compound are sprayed or dusted by methods well known to the art onto the particular area at the rate of around 2 to 8 lb./acre or somewhat more if necessary; for example, 10 lb. of active ingredient per acre. For most field applications, it is preferred to spray the herbicidal compositions of this invention at the rate of about 2 to about 10 lb. of active ingredient per acre. If, however, the herbicidal compositions are spread in a granular form over the area to be treated, it is preferred to employ a greater amount of active material per acre, suitably in the range of about 4 to about 10 lb. of an active substituted 3-pyridylmethane.

Seedlings and germinating weed seeds of many varieties of grasses are killed by the above treatment process, including both undesirable grasses such as the crabgrasses (*Digitaria sanguinalis* and *Digitaria ischaemum*); green and yellow foxtails (*Setaria viridis* and *Setaria glauca*), and the like, as well as seeds and seedlings of mustard (*Brassica juncea*), and pigweed (*Amaranthus retroflexus*). Field corn (*Zea maize*), cotton, and soybeans (*Glycine max*) are unaffected by preemergent application of the herbicidal compounds, although the compounds have postemergent herbicidal action against these last named crops, and against the crabgrasses, mustard, pigweed, foxtail and velvetleaf as well.

Preemergent application of sprays or dusts containing a compound of this invention as represented by the above formula, at the rate of about 8 lb. herbicidal compound per acre to an area infested with foxtail and crabgrass seeds, provided complete control of these undesirable grasses.

When sprays or dusts containing a compound represented by the generic formula, supra, are applied at the rate of about 8 lb. of herbicidal compound per acre to test flats planted with crops, for example, corn, cotton, soybeans, and infested with foxtail, crabgrass, mustard, pigweed, and velvet leaf, control of the weed species is obtained without harm to the crop plants.

The herbicidal compositions of this invention can be employed in other useful ways. For example, spray or dust compositions as provided by this invention can be used to eradicate crabgrass, mustard, and foxtail from perennial flower beds or to destroy germinating seeds of an undesired grass in turf. Other methods of employing the selective herbicidal compositions of this invention will be readily apparent to those skilled in the art.

The compounds useful in this invention are conveniently prepared by methods well known to the art. Thus, the 3-pyridyl-methane derivatives are readily synthesized by the methods taught by Van Heyningen et al., U.S. Pat. No. 3,397,273 Aug. 13, 1968); and the 3-pyridinemethanols and derivatives thereof are made available by methods taught by Van Heyningen, U.S. Pat. No. 3,396,224 Aug. 6, 1968). In particular, the α,α-dialkyl-substituted 3-pyridinemethanols are prepared according to the teaching of Wibaut et al., *Rec. Trav. Chim.*, 77, 1,057, (1958).

A number of the herbicidal methods and compositions of the present invention are illustrated by the following specific examples.

EXAMPLE 1

The following experimental procedure was used to demonstrate the efficacy of the compositions of this invention in killing germinating grasses without affecting the germination of seeds and the growth of seedlings of various broadleaf and leguminous plants.

A soil was prepared consisting of one part masonry sand and one part shredded top soil blended together in a cement mixer. One gallon of this soil was placed in a 25 × 35 cm. galvanized flat and was patted down with a bench brush until level. A three-row marker was used to make 2 ½cm. furrows in approximately two-fifths of the flat. Crop seeds consisting of four kernels of corn, five cotton seeds, and five soybean seeds were placed in these furrows. A four-row template was then placed on the remaining soil and the indicated amounts of each of the following seeds were planted, one species to each section: foxtail, 100 mg.; velvet leaf (*Abutilon theophiasti*), 50–75 mg.; rough pigweed (*Amaranthus retroflexus*), 30–50 mg.; and large crabgrass, 350–400 mg. Sufficient soil was added to cover the entire flat. Thus, the weed seeds were covered to a depth of about 6 mm. and the crop plant seeds were covered to a depth of about 3 cm.

In assaying the effect of the compositions as preemergent herbicides, a flat prepared as above was placed in a chamber equipped with a turntable and an air exhaust. The herbicidal composition, whether it was a spray-type emulsion formulated from the growth-inhibiting compound in combination with a wetting agent and a nonphytotoxic, inert diluent such as acetone, cellosolve, dimethylformamide, water, and the like, or a wettable powder, was applied to the flat with a modified DeVilbiss atomizer hooked to an air source. 12 ½ milliliters of the composition under test were applied to each flat either on the day of planting or the succeeding day. For measuring the efficacy of the herbicidal compositions as post-emergent herbicides, the same experimental setup was used except that the flats were sprayed after 9 to 12 days in a greenhouse, the length of growing time depending upon the season and light intensity. Injury ratings and observations as to type of injury were made in either case 11 to 12 days after treatment. The injury rating scale used was as follows:

0 — no injury
1 — slight injury
2 — moderate injury
3 — severe injury
4 — death

When more than one determination was carried out, an average value was calculated for the injury rating.

Tables I and II which follow set forth the results of preemergent and post-emergent testing of several substituted 3-pyridylmethanes, substituted 3-pyridinemethanols, and salts thereof. In both tables, Column 1 gives the name of the compound; Column 2, the rate in terms of pounds per acre at which the compound was applied to the test flat; and Columns 3 to 9, the injury rating for the particular plant seedlings or mature plants.

TABLE I.—INJURY RATING ON PRE-EMERGENT TREATMENT

| Compound | Lb./acre | Corn | Cotton | Soybeans | Crabgrass | Pigweed | Foxtail | Velvetleaf |
|---|---|---|---|---|---|---|---|---|
| 3-[Bis(4-fluorophenyl)methyl]pyridine | 8 | 0 | 0 | 0 | 3 | 3 | 2 | 0 |
|  | 4 | 0 | 0 | 0 | 2 | 4 | 3 | 0 |
|  | 2 | 0 | 0 | 0 | 2 | 1 | 2 | 0 |
| α-(4-Fluorophenyl)-α-phenyl-3-pyridinemethanol hydrochloride | 8 | 0 | 0 | 0 | 2 | 3 | 2 | 0 |
| α-(2-Chlorophenyl)-α-(4-fluorophenyl)-3-pyridinemethanol hydrochloride | 8 | 0 | 0 | 0 | 3 | 3 | 3 | 1 |
|  | 4 | 0 | 0 | 0 | 3 | 0 | 2 | 0 |
| α-(2,5-Dimethylphenyl)-α-phenyl-3-pyridinemethanol hydrochloride | 8 | 0 | 0 | 0 | 3 | 4 | 3 | 2 |
|  | 4 | 0 | 0 | 0 | 3 | 2 | 1 | 1 |
|  | 2 | 0 | 0 | 0 | 3 | 2 | 0 | 0 |
| α-(2,5-Dichlorophenyl)-α-(4-fluorophenyl)-3-pyridinemethanol hydrochloride | 8 | 0 | 0 | 0 | 2 | 4 | 3 | 0 |
| α-Cyclobutyl-α-(4-fluorophenyl)-3-pyridinemethanol | 8 | 0 | 0 | 0 | 3 | 3 | 2 | 2 |
|  | 4 | 0 | 0 | 1 | 3 | 3 | 3 | 1 |
|  | 2 | 0 | 0 | 0 | 3 | 3 | 3 | 1 |
| α,α-Bis(cyclopropyl)-3-pyridine-methanol hydrochloride | 8 | 0 | 0 | 0 | 3 | 3 | 3 | 2 |
|  | 4 | 0 | 0 | 0 | 2 | 0 | 1 | 1 |
| α,α-Bis(cyclohexyl)-3-pyridinemethanol | 8 | 0 | 0 | 0 | 3 | 4 | 2 | 1 |
| 3[α-Cyclohexyl-α-(1-cyclohexenyl)-methyl]pyridine | 8 | 1 | 0 | 0 | 4 | 4 | 3 | 3 |
|  | 4 | 0 | 0 | 0 | 3 | 4 | 2 | 1 |
|  | 2 | 0 | 0 | 0 | 3 | 2 | 3 | 0 |
|  | 1 | 0 | 0 | 0 | 3 | 4 | 2 | 0 |
| α,α-Bis(n-pentyl)-3-pyridinemethanol hydrochloride | 8 | 0 | 0 | 0 | 3 | 3 | 2 | 0 |
| α,α-Bis(isobutyl)-3-pyridinemethanol | 8 | 1 | 0 | 0 | 3 | 4 | 3 | 4 |
|  | 4 | 0 | 0 | 0 | 3 | 4 | 3 | 3 |
|  | 2 | 0 | 0 | 0 | 3 | 4 | 2 | 2 |
| α,α-Bis(isopentyl)-3-pyridinemethanol hydrochloride | 8 | 0 | 0 | 0 | 3 | 4 | 3 | 2 |
|  | 4 | 0 | 0 | 0 | 2 | 2 | 2 | 0 |
| α,α-Bis(n-propyl)-3-pyridinemethanol hydrochloride | 8 | 1 | 0 | 1 | 3 | 4 | 3 | 1 |
|  | 4 | 0 | 0 | 0 | 3 | 3 | 3 | 0 |
| α-(n-Pentyl)-α-phenyl-3-pyridine-methanol hydrochloride | 8 | 0 | 0 | 0 | 4 | 4 | 3 | 2 |
|  | 4 | 0 | 0 | 0 | 2 | 1 | 1 | 0 |
| α,α-Diphenyl-3-pyridineacetonitrile | 8 | 0 | 0 | 0 | 3 | 2 | 3 | 0 |
|  | 4 | 0 | 0 | 0 | 3 | 2 | 3 | 1 |
|  | 2 | 0 | 0 | 0 | 3 | 1 | 1 | 0 |
|  | 1 | 0 | 0 | 0 | 3 | 1 | 0 | 0 |
| 3-(α-Methyl-4-chlorobenzyl)pyridine hydrochloride | 8 | 1 | 0 | 0 | 3 | 4 | 3 | 3 |
|  | 4 | 0 | 0 | 0 | 2 | 0 | 3 | 0 |
| α-(3-Ethyl-n-pentyl)-α-isobutyl-3-pyridinemethanol hydrochloride | 8 | 0 | 0 | 0 | 4 | 2 | 3 | 2 |
| α-(n-Heptyl)-α-isobutyl-3-pyridine methanol | 8 | 0 | 0 | 1 | 2 | 3 | 3 | 3 | 3 |
|  | 4 | 0 | 0 | 0 | 0 | 3 | 4 | 3 | 3 |

TABLE I.—INJURY RATING ON PRE-EMERGENT TREATMENT—Continued

| Compound | Lb./acre | Corn | Cotton | Soybeans | Crabgrass | Pigweed | Foxtail | Velvetleaf |
|---|---|---|---|---|---|---|---|---|
| α,α-Bis(Cyclohexylmethyl)-3-pyridine methanol | 8 | 0 | 0 | 0 | 3 | 3 | 2 | 1 |
| α,α-Diphenyl-3-pyridinemethanol hydrochloride | 8 | 0 | 1 | 0 | 3 | 3 | 1 | 1 |
| α-(2-Chloro-5-nitrophenyl)-α-phenyl-3-pyridinemethanol | 8 | 0 | 0 | 0 | 2 | 4 | 2 | 0 |
| 3-[Bis(2-chlorophenyl)methyl]-pyridine hydrochloride | 8 | 0 | 0 | 0 | 3 | 0 | 3 | 1 |
| 2-(3-Pyridyl)-2-hexanol | 8 | 0 | 1 | 1 | 4 | 3 | 3 | |
| 5-(3-Pyridyl)-5-hydroxynonane | 8 | 0 | 0 | 1 | 4 | 2 | 3 | |
| α,α-Bis(cyclohexylmethyl)-3-pyridinemethanol hydrochloride | 8 | 0 | 0 | 0 | 3 | 3 | 2 | 1 |
| α,α-Bis(n-butyl)-3-pyridinemethanol hydrochloride | 8 | 0 | 0 | 0 | 3 | 4 | 3 | 3 |
| α-(4-Chlorophenyl)-α-cyclopropyl-3-pyridinemethanol | 8 | 0 | 0 | 0 | 4 | 4 | 3 | 2 |
|  | 4 | 0 | 0 | 0 | 3 | 3 | 3 | 2 |
|  | 2 | 0 | 0 | 0 | 2 | 2 | 2 | 1 |
| α-(4-Chlorophenyl)-α-cyclopropyl-3-pyridinemethanol hydrochloride | 8 | 0 | 0 | 2 | 4 | 4 | 3 | 2 |
|  | 4 | 0 | 0 | 1 | 3 | 4 | 3 | 1 |
|  | 2 | 0 | 0 | 0 | 3 | 1 | 3 | 1 |
| α-(4-Chlorophenyl)-α-ethynyl-3-pyridinemethanol | 8 | 0 | 0 | 2 | 3 | 4 | 3 | 2 |
|  | 4 | 0 | 0 | 1 | 3 | 4 | 3 | 1 |
|  | 2 | 0 | 0 | 0 | 1 | 0 | 2 | 1 |
| α-Phenyl-α-(2-thienyl)-3-pyridinemethanol hydrochloride | 8 | 0 | 0 | 2 | 3 | 4 | 3 | 0 |
|  | 4 | 0 | 0 | 0 | 2 | 2 | 2 | 0 |
| α-Isopropyl-α-phenyl-3-pyridine-methanol | 8 | 0 | 0 | 2 | 3 | 4 | 3 | 2 |
|  | 4 | 0 | 0 | 0 | 3 | 4 | 2 | 2 |
|  | 2 | 0 | 0 | 0 | 2 | 2 | 2 | 2 |
| α,α-Bis(cyclopropyl)-3-pyridinemethanol hydrochloride | 8 | 0 | 0 | 0 | 3 | 4 | 3 | 2 |
|  | 4 | 0 | 0 | 0 | 2 | 0 | 1 | 1 |
| α,α-Bis(cyclopropyl)-3-pyridinemethanol | 8 | 0 | 0 | 3 | 4 | 2 | 3 | 3 |
|  | 4 | 0 | 0 | 0 | 3 | 4 | 2 | 1 |

TABLE II.—INJURY RATING ON PRE-EMERGENT TREATMENT

| Compound | Lb./acre | Corn | Cotton | Soybeans | Crabgrass | Pigweed | Foxtail | Velvetleaf |
|---|---|---|---|---|---|---|---|---|
| 3-[Bis(4-fluorophenyl)methyl]-pyridine | 8 | 0 | 1 | 4 | 3 | 4 | 3 | 0 |
|  | 4 | 1 | 2 | 2 | 1 | 2 | 1 | 1 |
|  | 2 | 1 | 2 | 2 | 1 | 1 | 1 | 1 |
| α,α-Bis(isobutyl)-3-pyridine-methanol | 8 | 1 | 2 | 2 | 3 | 4 | 2 | 1 |
|  | 4 | 0 | 1 | 2 | 1 | 2 | 1 | 1 |
| α,α-Bis(cyclopropyl)-3-pyridine-methanol hydrochloride | 8 | 1 | 1 | 2 | 3 | 4 | 2 | 2 |
|  | 4 | 0 | 0 | 1 | 2 | 1 | 0 | 1 |
| 3-(α-Methyl-4-chlorobenzyl)-pyridine hydrochloride | 8 | 2 | 3 | 2 | 3 | 4 | 3 | 4 |
|  | 4 | 0 | 1 | 2 | 2 | 2 | 2 | 2 |
| 3-[1-(n-Heptyl)-n-octyl]-pyridine | 8 | 0 | 1 | 2 | 3 | 4 | 3 | 2 |
|  | 4 | 1 | 1 | 2 | 1 | 4 | 2 | 2 |
| α-(n-Heptyl)-α-isobutyl-3-pyridinemethanol | 8 | 1 | 1 | 2 | 3 | 3 | 1 | 2 |
| α,α-Diphenyl-3-pyridineacetonitrile | 8 | 1 | 1 | 3 | 2 | 2 | 1 | 1 |
| α,α-Bis(isopentyl)-3-pyridinemethanol hydrochloride | 8 | 0 | 1 | 2 | 2 | 2 | 2 | 2 |
| α,α-Diphenyl-3-pyridinemethanol hydrochloride | 8 | 1 | 1 | 3 | 1 | 1 | 1 | 1 |
| α,α-Bis(n-butyl)-3-pyridine-methanol hydrochloride | 8 | 0 | 0 | 1 | 2 | 4 | 2 | 4 |
|  | 4 | 0 | 0 | 1 | 2 | 3 | 1 | 4 |

To control the growth of suckers on tobacco plants the compounds described herein are applied to growing tobacco plants at a rate of 0.125 to 2 lbs. per acre. For such application the compounds are formulated into sprays or wettable powders as described above and applied to the foliage of the plants. We have seen no injury to the tobacco plants at the rates used. The inhibition of sucker growth will be illustrated by the following example.

EXAMPLE 2

Growing tobacco plants were topped, suckers over 1 inch in length were removed, and each plant was sprayed with 20 ml. of a formulation containing the concentration of the test compound indicated in parts per million. The suckers on the plants were measured, and the growth of suckers on treated plants was compared to growth on untreated controls. One, two, or three comparisons were made at intervals of 1 to 2 weeks. In some cases, after the third measurement the suckers were removed, weighed, and the weights of suckers from treated plants compared with the weights of suckers from control plants. The percent of inhibition was then calculated from the following formula.

Percent inhibition $= \dfrac{\text{Control measurement} - \text{treated measurement}}{\text{Control measurement}} \times 100$ The results are summarized in Table III.

Table III.—Tobacco Sucker Control

| Compound | Conc., ppm. | Percent inhibition | | | Weight |
|---|---|---|---|---|---|
| | | 1 | 2 | 3 | |
| 3-(2,2'-dichlorophenyl-methyl)pyridine | 1,000 | 51.6 | 36 | 75.9 | 57.4 |
| | 1,800 | 70 | 44 | 86.8 | 92 |
| | 2,500 | 80 | 50 | 98.8 | 99.9 |
| | 3,600 | 87.8 | 70 | 88. | 88.6 |
| | 5,000 | 91.8 | 76 | 99.9 | 98.8 |
| 3-[1-(2-chlorophenyl)-n-heptyl]pyridine | 500 | 30.1 | 51.9 | | 15.6 |
| | 1,000 | 35.5 | 45.6 | | 19.3 |
| | 2,000 | 78.6 | 77.0 | | 62.1 |
| 3[α-(n-pentoxy)benzyl]-pyridine | 500 | 27.2 | 24.7 | 0 | |
| | 1,000 | 24.5 | 13.2 | 14.5 | |
| | 2,000 | 43.9 | 41.4 | 43.5 | |
| 2-(2-chloro-α-cyclohexyl-benzyl)pyridine | 500 | 10.6 | 7.8 | | |
| | 1,000 | 14.1 | 8.7 | | |
| | 2,000 | 10.1 | 8.3 | | |
| 4-(4-pyridyl)heptanol-4 | 500 | 9.5 | 0 | 0 | |
| | 1,000 | 18.1 | 2.7 | 36.6 | |
| | 2,000 | 18.1 | 4.0 | 87.2 | |
| α,α-bis(n-pentyl)-4-pyridinemethanol | 500 | 0 | 0 | 0 | |
| | 1,000 | 30.3 | 1.0 | 57.6 | |
| | 2,000 | 7.7 | 1.3 | 35.7 | |
| α-(4-chlorophenyl)-α-(2,4-dichlorobenzyl)-3-pyridinemethanol sulfate | 500 | 0 | 0 | 0 | |
| | 1,000 | 42.5 | 53.8 | 58.8 | |
| | 2,000 | 0 | 9.7 | 0 | |
| α-cyclobutyl-α-(4-fluorophenyl)-3-pyridinemethanol | 500 | 50.1 | 52.7 | 81.6 | |
| | 1,000 | 78.6 | 83.2 | 64.7 | |
| | 2,000 | 70.9 | 76.8 | 79.1 | |
| 3-(1,2-diphenylethyl)-pyridine | 500 | 49.4 | 25.2 | 0. | |
| | 1,000 | 58.2 | 63.7 | 55.2 | |
| | 2,000 | 47.5 | 65.8 | 47.7 | |
| 2-(2,5-dimethylphenyl)-α-phenyl-3-pyridinemethanol hydrochloride | 2,000 | 55.4 | 77.9 | 87.1 | 94 |
| | 4,000 | 71.4 | 38.4 | 27.9 | 37.4 |
| 2-(3-pyridyl)-1-(4-chlorophenyl)2-2-propanol | 500 | 55 | | | |
| | 1,000 | 19 | | | |
| | 2,000 | 35 | | | |
| α-(n-pentyl)-α-phenyl-3-pyridinemethanol hydrochloride | 2,000 | 43.1 | 35.5 | 28.5 | 47.6 |
| | 4,000 | 89.2 | 74.2 | 68.1 | 92 |
| α,α-bis(cyclohexyl)-3-pyridinemethanol | 2,000 | 91.1 | 90.2 | 81.1 | 91.9 |
| | 4,000 | 79.3 | 67.2 | 70.3 | 85 |
| 3-pyridyl-4-chlorophenyl-4-chlorobenzyl-carbinol | 500 | 60.6 | 96.6 | | |
| | 1,000 | 27.6 | 26.1 | | |
| | 2,000 | 0 | 0 | | |
| α-(4-chlorophenyl)-α-cyclopropyl-3-pyridinemethanol hydrochloride | 2,000 | 91.1 | 90.2 | 85.6 | 91.4 |
| | 4,000 | 93.9 | 100 | 100 | 100 |
| 3-pyridyldiphenyl-methane | 500 | 30.8 | 20.6 | 0 | |
| | 1,000 | 45.3 | 44.6 | 2.8 | |
| | 2,000 | 75.1 | 78.6 | 56.9 | |
| 3-[α-(2,5-dimethylphenyl)benzyl]-pyridine | 2,000 | 93.9 | 98.4 | 99.1 | 99.7 |
| | 4,000 | 88.2 | 95.1 | 97.3 | 99.5 |
| α-(2-chlorophenyl)-α-cyclohexyl-2-pyridinemethanol | 500 | 51.3 | 48.6 | 56.2 | |
| | 1,000 | 74.7 | 56.1 | 61.4 | |
| | 2,000 | 0 | 0 | 0 | |
| 3-[bis(4-chlorophenyl)methyl]pyridine hydrochloride | 500 | 0 | | | |
| | 1,000 | 91.4 | | | |
| | 2,000 | 20 | | | |
| Bis(4-chlorophenyl)-3-pyridylmethane | 500 | 0 | 0 | | |
| | 1,000 | 13.4 | 80.7 | | |
| | 2,000 | 74 | 85.2 | | |
| 3-bis(2,5-dichlorophenyl)methylpyridine | 500 | 61.4 | 100 | | |
| | 1,000 | 43.2 | 56.8 | | |
| | 2,000 | 100 | 100 | | |
| 3-dicyclohexylmethyl-pyridine | 500 | 0 | | | |
| | 1,000 | 0 | | | |
| | 2,000 | 94.2 | | | |

It will be noted that 3-(2,2'-dichlorodiphenylmethyl)-pyridine is an especially active compound. Its activity is somewhat different from presently used tobacco desuckering agents in that it appears not only to depress the formation of new suckers, but also removes small suckers as well.

In addition to the above-described herbicidal and tobacco desuckering activity, the pyridine compounds described herein have been found to exhibit general plant growth inhibiting activity, especially with regard to foliar growth. For example, the application of 3-(2,2'-dichlorodiphenyl)pyridine to blue grass at a rate of 0.4 to 10 lbs./acre retards the growth of the grass leaves, thereby requiring less frequent mowing. The application of α-(4-chlorophenyl)-α-cyclopropyl-3-pyridinemethanol to mature soybeans at a rate of 0.4 to 10 lbs./acre retards foliar growth, permitting the plant to devote all its energy to fruit growth.

In general, application of the compounds may be as a foliar spray or a soil drench using techniques well known to those skilled in the art. At times, treatment may be effected by a seed soak treatment. In this method of treatment the seeds to be treated are allowed to stand in a solution of the compound for a period of several hours. The solution is prepared by dissolving the compound in an inert solvent such as acetone and diluting to the desired concentration with water containing a surface active agent.

We claim:

1. A method for inhibiting the growth of germinating weed seeds and seedling weeds which comprises applying to said seeds and seedlings a herbicidally effective amount of a compound of the formula:

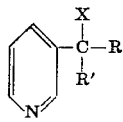

wherein X is hydrogen, hydroxyl, $C_1$–$C_3$ alkoxy, amino, or cyano;

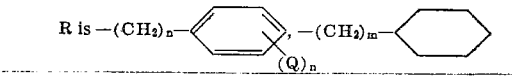

$C_1$–$C_6$ alkoxy, $C_1$–$C_{12}$ alkyl, $C_2$–$C_8$ alkenyl, $C_2$–$C_8$ alkynyl, $C_3$–$C_8$ cycloalkyl, or $C_4$–$C_8$ cycloalkenyl; R' is R, pyridyl, or thienyl;

each Q independently is halo, nitro, $C_1$–$C_3$ alkyl, $C_1$–$C_3$ alkoxy, trifluoromethyl, $C_1$–$C_3$ alkylthio, $C_1$–$C_3$ alkyl—SO—, or $C_1$–$C_3$ alkyl—SO$_2$—, or two Qs taken together are methylenedioxy;

each n independently is an integer of 0 to 3; and m is an integer of 1 to 3;

and the acid addition salts thereof.

2. A method as in claim 1 wherein the compound is applied at a rate between about 2 and about 8 lbs. per acre.

3. A method as in claim 1 wherein X is hydrogen.

4. A method as in claim 3 wherein the compound is 3-[α-cyclohexyl-α-(1-cyclohexenyl)methyl]pyridine.

5. A method as in claim 3 wherein the compound is 3-[bis(4-fluorophenyl)methyl]pyridine.

6. A method as in claim 1 wherein X is hydroxyl.

7. A method as in claim 6 wherein the compound is α,α-diisobutyl-3-pyridinemethanol.

8. A method as in claim 6 wherein the compound is α-(2,5-dimethylphenyl)-α-phenyl-3-pyridinemethanol hydrochloride.

9. A method as in claim 6 wherein the compound is α-cyclobutyl-α-(4-fluorophenyl)-3-pyridinemethanol.

* * * * *